(12) United States Patent
Zhang et al.

(10) Patent No.: US 10,084,522 B2
(45) Date of Patent: Sep. 25, 2018

(54) METHOD AND NODE IN A WIRELESS COMMUNICATION NETWORK

(71) Applicant: Huawei Technologies Co., Ltd., Shenzhen (CN)

(72) Inventors: Zixin Zhang, Gothenburg (SE); Simon Andersson, Gothenburg (SE); Björn Sihlbom, Gothenburg (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 233 days.

(21) Appl. No.: 15/055,237

(22) Filed: Feb. 26, 2016

(65) Prior Publication Data

US 2016/0182136 A1 Jun. 23, 2016

Related U.S. Application Data

(63) Continuation of application No. PCT/EP2013/067906, filed on Aug. 29, 2013.

(51) Int. Cl.
*H04B 7/06* (2006.01)
*H04B 7/0456* (2017.01)
*H04B 7/26* (2006.01)
*H04J 11/00* (2006.01)
*H04L 5/00* (2006.01)
*H04L 27/20* (2006.01)
(Continued)

(52) U.S. Cl.
CPC ......... *H04B 7/0617* (2013.01); *H04B 7/0465* (2013.01); *H04B 7/26* (2013.01);
(Continued)

(58) Field of Classification Search
CPC ... H04B 7/04; H04B 7/26; H04J 11/00; H04L 12/815; H04L 27/20; H04L 5/00
See application file for complete search history.

(56) References Cited

U.S. PATENT DOCUMENTS 8,335,225 B2 12/2012 Cimini, Jr. et al.
8,369,809 B2 2/2013 Batruni
(Continued)

FOREIGN PATENT DOCUMENTS

CN 1675873 A 9/2005
CN 101867544 A 10/2010
(Continued)

OTHER PUBLICATIONS

Gao et al., "Non-Redundant Precoding and PAPR Reduction in MIMO OFDM Systems with ICA Based Blind Equalization," IEEE Transactions on Wireless Communications, vol. 8, No. 6, pp. 3038-3049, Institute of Electrical and Electronics Engineers, New York, New York (Jun. 2009).

*Primary Examiner* — Anez Ebrahim
(74) *Attorney, Agent, or Firm* — Leydig, Voit & Mayer, Ltd.

(57) ABSTRACT

Radio network node and method in a radio network node, for wireless communication with a user equipment in a wireless communication system in antenna streams, wherein the radio network node comprises a plurality of antenna elements, forming a multiple antenna array which is configured for massive MIMO transmission. The method comprises beamforming a signal to be transmitted to the user equipment by splitting and phase shifting said signal; detecting a peak of power of one beamformed signal, exceeding a threshold value; manipulating said signal until the peak of power of the signal is lower than said threshold value; and transmitting said signal, to be received by the user equipment.

10 Claims, 9 Drawing Sheets

(51) Int. Cl.
  *H04L 12/815* (2013.01)
  *H04W 88/02* (2009.01)
  *H04W 88/08* (2009.01)

(52) U.S. Cl.
  CPC ........ *H04J 11/0033* (2013.01); *H04L 5/0023* (2013.01); *H04L 27/205* (2013.01); *H04L 47/22* (2013.01); *H04W 88/02* (2013.01); *H04W 88/08* (2013.01)

(56) References Cited

U.S. PATENT DOCUMENTS

| | | |
|---|---|---|
| 2003/0235255 A1 | 12/2003 | Ketchum et al. |
| 2009/0310710 A1 | 12/2009 | Farrokhi |
| 2010/0046666 A1 | 2/2010 | Ketchum et al. |
| 2010/0266055 A1 | 10/2010 | Mueck et al. |
| 2011/0105172 A1* | 5/2011 | Guo ............... H04B 7/0413 455/522 |
| 2011/0280341 A1* | 11/2011 | Rofougaran ......... H04B 7/0617 375/302 |
| 2012/0276892 A1 | 11/2012 | Lin |
| 2013/0057432 A1* | 3/2013 | Rajagopal, Sr. ......... H01Q 3/26 342/368 |
| 2013/0076566 A1 | 3/2013 | Jiang et al. |

FOREIGN PATENT DOCUMENTS

| | | |
|---|---|---|
| CN | 102263580 A | 11/2011 |
| CN | 102577593 A | 7/2012 |

\* cited by examiner

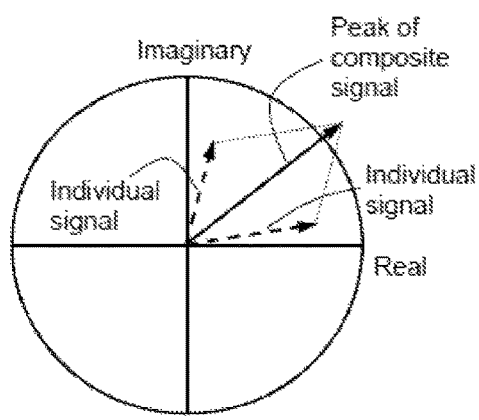
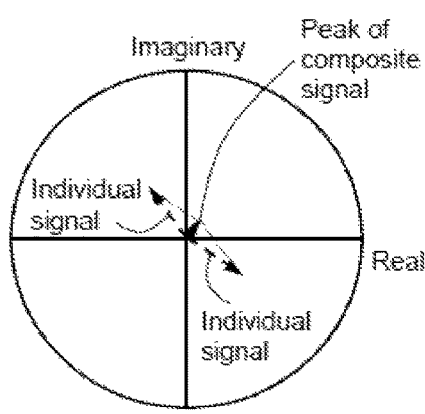
Fig. 3C  Fig. 3D
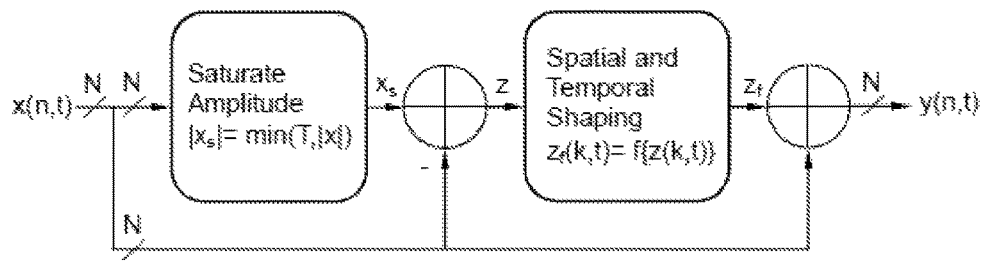
Fig. 4A

METHOD AND NODE IN A WIRELESS COMMUNICATION NETWORK

CROSS-REFERENCE TO RELATED APPLICATIONS

This application is a continuation of International Patent Application No. PCT/EP2013/067906, filed on Aug. 29, 2013, which is hereby incorporated by reference in its entirety.

TECHNICAL FIELD

Implementations described herein generally relate to a radio network node and a method in a radio network node. In particular is herein described a mechanism for communicating wireless signals in antenna streams in a multiple antenna environment.

BACKGROUND

A User Equipment (UE), also known as a mobile station, wireless terminal and/or mobile terminal is enabled to communicate wirelessly in a wireless communication network, sometimes also referred to as a cellular radio system. The communication may be made, e.g., between UEs, between a UE and a wire connected telephone and/or between a UE and a server via a Radio Access Network (RAN) and possibly one or more core networks. The wireless communication may comprise various communication services such as voice, messaging, packet data, video, broadcast, etc.

The UE may further be referred to as mobile telephone, cellular telephone, computer tablet or laptop with wireless capability, etc. The UE in the present context may be, for example, portable, pocket-storable, hand-held, computer-comprised, or vehicle-mounted mobile devices, enabled to communicate voice and/or data, via the radio access network, with another entity, such as another UE or a server.

The wireless communication network covers a geographical area which is divided into cell areas, with each cell area being served by a radio network node, or base station, e.g., a Radio Base Station (RBS) or Base Transceiver Station (BTS), which in some networks may be referred to as "eNB", "eNodeB", "NodeB" or "B node", depending on the technology and/or terminology used.

Sometimes, the expression "cell" may be used for denoting the radio network node itself. However, the cell may also in normal terminology be used for the geographical area where radio coverage is provided by the radio network node at a base station site. One radio network node, situated on the base station site, may serve one or several cells. The radio network nodes may communicate over the air interface operating on radio frequencies with any UE within range of the respective radio network node.

In some radio access networks, several radio network nodes may be connected, e.g., by landlines or microwave, to a Radio Network Controller (RNC), e.g., in Universal Mobile Telecommunications System (UMTS). The RNC, also sometimes termed Base Station Controller (BSC), e.g., in GSM, may supervise and coordinate various activities of the plural radio network nodes connected thereto. GSM is an abbreviation for Global System for Mobile Communications (originally: Groupe Special Mobile).

In 3rd Generation Partnership Project (3GPP) Long Term Evolution (LTE) radio network nodes, which may be referred to as eNodeBs or eNBs, may be connected to a gateway, e.g., a radio access gateway, to one or more core networks.

In the present context, the expressions downlink, downstream link or forward link may be used for the transmission path from the radio network node to the UE. The expression uplink, upstream link or reverse link may be used for the transmission path in the opposite direction, i.e., from the UE to the radio network node.

Beyond 3G mobile communication systems, such as e.g., 3GPP LTE, offer high data rate in the downlink by employing multiple antenna systems utilising Multiple-Input and Multiple-Output (MIMO).

Massive MIMO is a recently emerged technology that uses large Antenna Arrays Systems (AAS) with individual transceivers to improve throughput of wireless communication systems. Massive MIMO may sometimes also be referred to as "very large MIMO system", or "large-scale antenna system".

Antenna arrays with large number of elements enable the increase in capacity by utilising spatial beam forming and spatial multiplexing. The benefit of these large arrays is the ability to spatially resolve and separate received and transmitted signals with very high resolution.

The resolution is determined by the number of antenna elements, and their spacing. Typically the number of transceivers may be as high as 10× the maximum rank of the system. The rank is defined as the total number of parallel (same time and frequency) transmissions, including both wanted and unwanted signals (i.e. interference). Massive MIMO is sometimes loosely defined as a system using comprising 100 or more transceivers.

Basically, the more antennas the transmitter/receiver is equipped with in massive MIMO, the more the possible signal paths, the better the performance in terms of data rate and link reliability. Advantages with massive MIMO comprise improved UE detection and reduced transmit power per UE, thanks to the high resolution of massive MIMO.

However, moving from single antenna systems towards massive MIMO systems creates new problems and challenges that need to be solved, in order to reap the benefits.

Pre-distortion is performed in order to minimize nonlinearity effects in an amplifier. For a single antenna system, it is possible to have heavy Digital Pre Distortion (DPD) on the antenna element. But for a Massive MIMO system, since there are lots of antennas, it is required to have a heavy DPD for each amplifier, which is expensive and energy consuming.

One way to circumvent this problem may be to lower the Peak to Average Ratio (PAPR) of the signals going through each element. The technology that is currently in use is called Clipping. The signal is simply cut off when a signal peak is exceeding a threshold level. The signal is then filtered to retain a more spectral limited shape. To be more precise, firstly, a peak identifier will detect one or more peaks from the input signal. Then a cancellation pulse will be calculated to cut off the peaks. The crest factor reduced signal then needs to be filtered to reduce the undesired frequency components which will contribute to Adjacent Channel Leakage Ratio (ACLR).

Clipping however introduces an error in the transmitted signal which makes the receiver experience an increased Error Vector Magnitude (EVM), a difference of the received signal to the ideal one, which in the worst case may result in an erroneous decoded symbol. Clipping also widens the signals spectrum by creating hard clips.

Clipping is quite crude since it cuts a signal once it goes above a threshold and this will affect the UEs which added up to this peak. They will experience EVM, a difference from the expected signal to what is received which in the worst case may result in an erroneous decoded symbol.

ACLR will put energy outside of the systems initial frequency band because the hard clipping has a wider frequency spectrum which cannot be smoothed out completely by filtering. There is a maximum allowed ACLR for a system. Clipping may also put unwanted energy inside the systems own frequency band that will also contribute to EVM.

It appears that massive MIMO requires further development of the digital pre-processing for becoming feasible for practical implementation.

SUMMARY

It is therefore an object to obviate at least some of the above mentioned disadvantages and to improve the performance in a wireless communication network.

This and other objects are achieved by the features of the appended independent claims. Further implementation forms are apparent from the dependent claims, the description and the figures.

According to a first aspect, a method is provided in a radio network node, for wireless communication with a user equipment in a wireless communication system in antenna streams. The radio network node comprises a plurality of antenna elements, forming a multiple antenna array which is configured for massive MIMO transmission. The method comprises beamforming a signal to be transmitted to the user equipment by splitting and phase shifting said signal. Further, the method also comprises detecting a peak of power of one beamformed signal, exceeding a threshold value. Also, the method furthermore comprises manipulating the signal until the peak of power of the signal is lower than the threshold value. In addition, the method further also comprises transmitting the signal, to be received by the user equipment.

In a first possible implementation of the method according to the first aspect, the manipulation of the signal may comprise further phase shifting said signal until the peak of power of the signal is lower than said threshold value. The manipulation of the signal may also comprise estimating power loss and phase error on the further phase shifted signal, as perceived by the user equipment. Furthermore, the manipulation of the signal also may comprise, in addition, compensating the signal for the further phase shift, based on the estimated power loss and phase error.

In a second possible implementation of the method according to the first aspect, the manipulation of the signal may comprise spatial and temporal shaping of a correction signal, which correction signal is applied to the signal to be transmitted to the user equipment, until the peak of power of the signal is lower than the threshold value.

In a third possible implementation of the method according to the second possible implementation of the first aspect, the spatial and temporal shaping of the correction signal may comprise determining angle of departure of each beam to be transmitted by the multiple antenna array. Further, the spatial and temporal shaping of the correction signal may comprise removing energy of the correction signal in directions according to the determined respective angle of departure of each beam to be transmitted by the multiple antenna array.

In a fourth possible implementation of the method according to the second possible implementation of the first aspect, and/or the third possible implementation of the first aspect, the spatial and temporal shaping of the correction signal may comprise transformation of the correction signal into antenna domain and application of a filter for filtering the correction signal.

In a fifth possible implementation of the method according to the first aspect, the signal to be transmitted may comprise Orthogonal Frequency Division Multiplexing (OFDM) symbols.

According to a second aspect, a radio network node is provided configured for wireless communication with a user equipment in a wireless communication system in antenna streams. The radio network node comprises a plurality of antenna elements, forming a multiple antenna array which is configured for massive MIMO transmission. The radio network node further comprises a processor, configured for beamforming a signal to be transmitted to the user equipment by splitting and phase shifting the signal, and also configured for detecting a peak of power of one beamformed signal, exceeding a threshold value, and configured for manipulating said signal until the peak of power of the signal is lower than said threshold value. The radio network node further comprises a transmitter, configured for transmitting the signal, to be received by the user equipment.

In a first possible implementation of the radio network node according to the second aspect, the processor also may be configured for further phase shifting the signal until the peak of power of the signal is lower than the threshold value. The processor may in addition also be configured for estimating power loss and phase error on the further phase shifted signal, as perceived by the user equipment. Furthermore, the processor may further be configured for compensating the signal for the further phase shift, based on the estimated power loss and phase error.

In a second possible implementation of the radio network node according to the second aspect, or of the first possible implementation of the second aspect, the processor may further be configured for manipulating the signal by spatial and temporal shaping of a correction signal, which correction signal may be applied to the signal to be transmitted to the user equipment, until the peak of power of the signal is lower than the threshold value.

In a third possible implementation of the radio network node according to the second aspect, the processor may further be configured for determining angle of departure of each beam to be transmitted by the multiple antenna array. Further, the processor may also be configured for removing energy of the correction signal in directions according to the determined respective angle of departure of each beam to be transmitted by the multiple antenna array.

In a fourth possible implementation of the radio network node according to the second aspect, the processor may also be additionally configured for transformation of the correction signal into antenna domain and application of a filter for filtering the correction signal.

In a fifth possible implementation of the radio network node according to the second aspect, the signal to be transmitted comprises Orthogonal Frequency Division Multiplexing (OFDM) symbols.

In a sixth possible implementation of the radio network node according to the second aspect, the radio network node comprises an evolved NodeB (eNodeB), and wherein the wireless communication network is based on 3rd Generation Partnership Project Long Term Evolution (3GPP LTE).

According to a third aspect, a computer program comprising program code for performing a method according to the first aspect is provided, for wireless communication with a user equipment in a wireless communication system in antenna streams, when the computer program is loaded into a processor of the radio network node according to the second aspect.

According to a forth aspect, a computer program product is provided, comprising a computer readable storage medium storing program code thereon for use by a radio network node, for wireless communication with a user equipment in a wireless communication system in antenna streams. The program code comprises instructions for executing a method comprising beamforming a signal to be transmitted to the user equipment by splitting and phase shifting said signal; detecting a peak of power of one beamformed signal, exceeding a threshold value; manipulating the signal until the peak of power of the signal is lower than said threshold value; and transmitting the signal, to be received by the user equipment.

Thanks to the herein described aspects, a Peak to Average Power Ratio (PAPR) of a multi antenna system may be reduced, while retaining the spectral shape of the initial signal which gives no Error Vector Magnitude (EVM) and no Adjacent Channel Leakage Ratio (ACLR). This may be achieved by compensating of phase error and power loss after lowering the PAPR of signals using phase shifts to each antenna element for a multi antenna system. Furthermore, by manipulating the spatial profile of the emitted signal PAPR may be reduced in each branch in relevant directions, while distortion of the signal in form of EVM may be avoided. Thereby an improved performance within the wireless communication network is provided.

Other objects, advantages and novel features of the aspects of the disclosure will become apparent from the following detailed description.

BRIEF DESCRIPTION OF THE DRAWINGS

Various embodiments of the disclosure are described in more detail with reference to attached drawings illustrating examples of embodiments of the disclosure in which:

FIG. 3C is a block diagram illustrating an embodiment of the disclosure.

FIG. 3D is a block diagram illustrating an embodiment of the disclosure.

FIG. 4A is a block diagram illustrating a radio network node architecture according to an embodiment of the disclosure.

DETAILED DESCRIPTION

Embodiments of the disclosure described herein are defined as a radio network node and a method in a radio network node, which may be put into practice in the embodiments described below. These embodiments may, however, be exemplified and realised in many different forms and are not to be limited to the examples set forth herein; rather, these illustrative examples of embodiments are provided so that this disclosure will be thorough and complete.

Still other objects and features may become apparent from the following detailed description, considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 1:
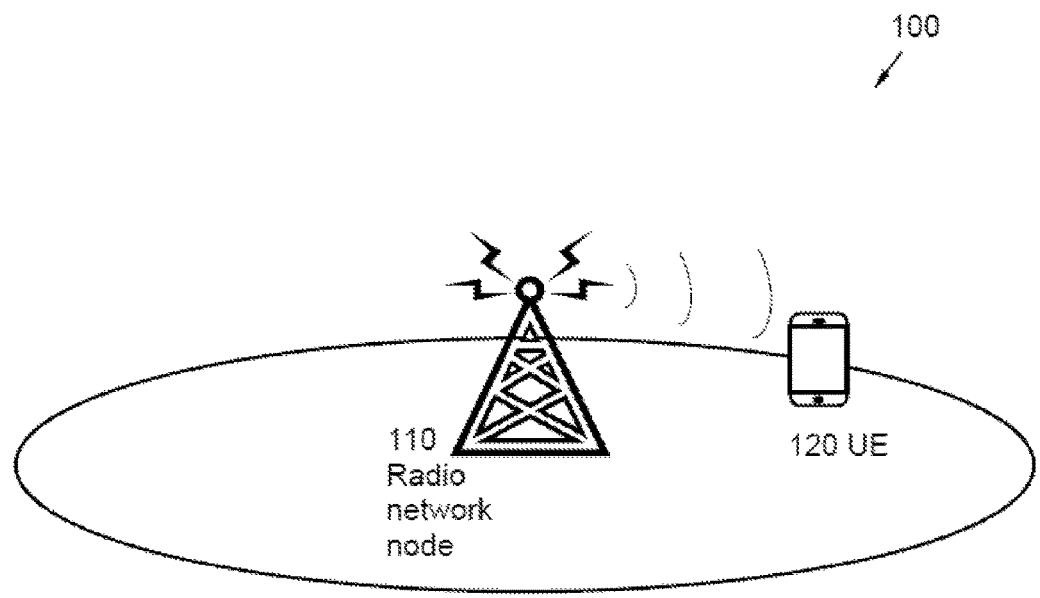
FIG. 1 is a block diagram illustrating a wireless communication network according to some embodiments of the disclosure.

FIG. 1 is a schematic illustration over a wireless communication network 100 comprising a radio network node 110 and a User Equipment (UE) 120.

The wireless communication network 100 may at least partly be based on radio access technologies such as, e.g., 3GPP LTE, LTE-Advanced, Evolved Universal Terrestrial Radio Access Network (E-UTRAN), Universal Mobile Telecommunications System (UMTS), Global System for Mobile Communications (originally: Groupe Special Mobile) (GSM)/Enhanced Data rate for GSM Evolution (GSM/EDGE), Wideband Code Division Multiple Access (WCDMA), Time Division Multiple Access (TDMA) networks, Frequency Division Multiple Access (FDMA) networks, Orthogonal FDMA (OFDMA) networks, Single-Carrier FDMA (SC-FDMA) networks, Worldwide Interoperability for Microwave Access (WiMax), or Ultra Mobile Broadband (UMB), High Speed Packet Access (HSPA) Evolved Universal Terrestrial Radio Access (E-UTRA), Universal Terrestrial Radio Access (UTRA), GSM EDGE Radio Access Network (GERAN), 3GPP2 CDMA technologies, e.g., CDMA2000 1xRTT and High Rate Packet Data (HRPD), just to mention some few options. The expressions "wireless communication network", "wireless communication system" and/or "cellular telecommunication system" may within the technological context of this disclosure sometimes be utilised interchangeably.

The wireless communication network 100 may be configured to operate according to the Time Division Duplex (TDD) and/or the Frequency Division Duplex (FDD) principle, according to different embodiments.

TDD is an application of time-division multiplexing to separate uplink and downlink signals in time, possibly with a Guard Period (GP) situated in the time domain between the uplink and downlink signalling. FDD means that the transmitter and receiver operate at different carrier frequencies.

Further, the wireless communication network 100 is configurable for massive MIMO and AAS, according to some embodiments.

The purpose of the illustration in FIG. 1 is to provide a simplified, general overview of the wireless communication network 100 and the involved methods and nodes, such as the radio network node 110 and user equipment 120 herein described, and the functionalities involved. The methods, radio network node 110 and user equipment 120 will subsequently, as a non-limiting example, be described in a 3GPP LTE/LTE-Advanced environment, but the embodiments of the disclosed methods, radio network node 110 and user equipment 120 may operate in a wireless communication network 100 based on another access technology such as, e.g., any of the above already enumerated. Thus, although the embodiments of the disclosure are described based on, and using the lingo of, 3GPP LTE systems, it is by no means limited to 3GPP LTE.

The illustrated wireless communication network 100 comprises the radio network node 110, which may send radio signals to be received by the user equipment 120.

It is to be noted that the illustrated network setting of one radio network node 110 and one user equipment 120 in FIG. 1 is to be regarded as a non-limiting example of an embodiment only. The wireless communication network 100 may comprise any other number and/or combination of radio network nodes 110 and/or user equipment 120. A plurality of user equipment 120 and another configuration of radio network nodes 110 may thus be involved in some embodiments of the disclosure.

Thus whenever "one" or "a/an" user equipment 120 and/or radio network node 110 is referred to in the present context, a plurality of user equipment 120 and/or radio network nodes 110 may be involved, according to some embodiments.

The radio network node 110 may according to some embodiments be configured for downlink transmission and may be referred to, respectively, as e.g., a base station, NodeB, evolved Node Bs (eNB, or eNode B), base transceiver station, Access Point Base Station, base station router, Radio Base Station (RBS), micro base station, pico base station, femto base station, Home eNodeB, sensor, beacon device, relay node, repeater or any other network node configured for communication with the user equipment 120 over a wireless interface, depending, e.g., of the radio access technology and/or terminology used.

The user equipment 120 may correspondingly be represented by, e.g. a wireless communication terminal, a mobile cellular phone, a Personal Digital Assistant (PDA), a wireless platform, a mobile station, a tablet computer, a portable communication device, a laptop, a computer, a wireless terminal acting as a relay, a relay node, a mobile relay, a Customer Premises Equipment (CPE), a Fixed Wireless Access (FWA) nodes or any other kind of device configured to communicate wirelessly with the radio network node 110, according to different embodiments and different vocabulary.

Some embodiments of the disclosure define a modular implementation approach, and make it possible to reuse legacy systems such as e.g. standards, algorithms, implementations, components and products. The modular architecture also scales up/down to support implementations on e.g. small cell BTS products.

According to an embodiment, the PAPR of the multi antenna system is reduced while retaining the spectral shape of the initial signal which gives no EVM and no ACLR.

Figure 2:
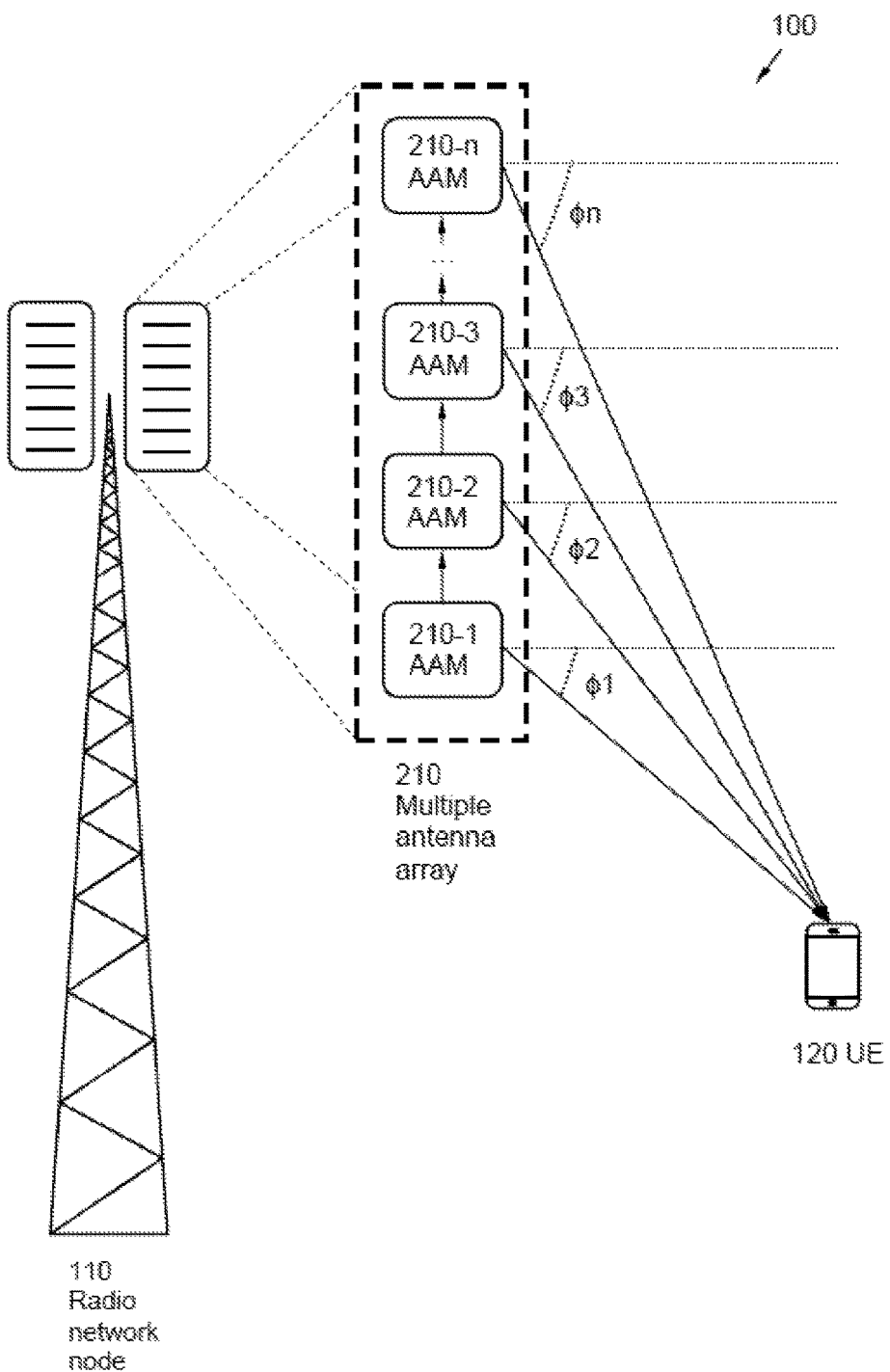
FIG. 2 is a block diagram illustrating a wireless communication network according to some embodiments of the disclosure.

FIG. 2 discloses an embodiment of the radio network node 110 in the wireless communication network 100. The radio network node 110 comprises, or is connectable to, a Multiple Antenna Array 210, which is configurable for massive MIMO. The Multiple Antenna Array 210 comprises a plurality of antenna elements 210-1, 210-2, ..., 210-n. The antenna elements 210-1, 210-2, ..., 210-n may sometimes also be referred to as Active Antenna Modules (AAM).

The illustrated MIMO system uses beamforming that will split up a signal that is to be transmitted into as many copies as there are antennas in the system. Each signal will experience a phase shift according to where the beam should be steered. In case there is more than one beam each antenna will receive multiple signals. Thus signals which are intended to be received by the UU 120 are transmitted at different angles of departure $\phi 1, \phi 2, \ldots, \phi n$ at each respective antenna element 210-1, 210-2, ..., 210-n comprised in the multiple antenna array 210.

According to an embodiment of the disclosure, the signals coming in to each antenna element 210-1, 210-2, ..., 210-n may be analyzed and, if a peak above a threshold level is found, the phase of the incoming signals may be changed in order to lower the PAPR. This added phase shift will somewhat distort the signal, why a compensation for power loss and phase error may be performed before transmission of the signal. Thereby, PAPR may be reduced without introducing EVM or ACLR due to clipping.

Another advantage is that implementation may be made by digital processing in a central unit instead of a clipping box in front of each antenna element 210-1, 210-2, ..., 210-n. Thereby, implementation and software-updating are facilitated.

Figure 3A:
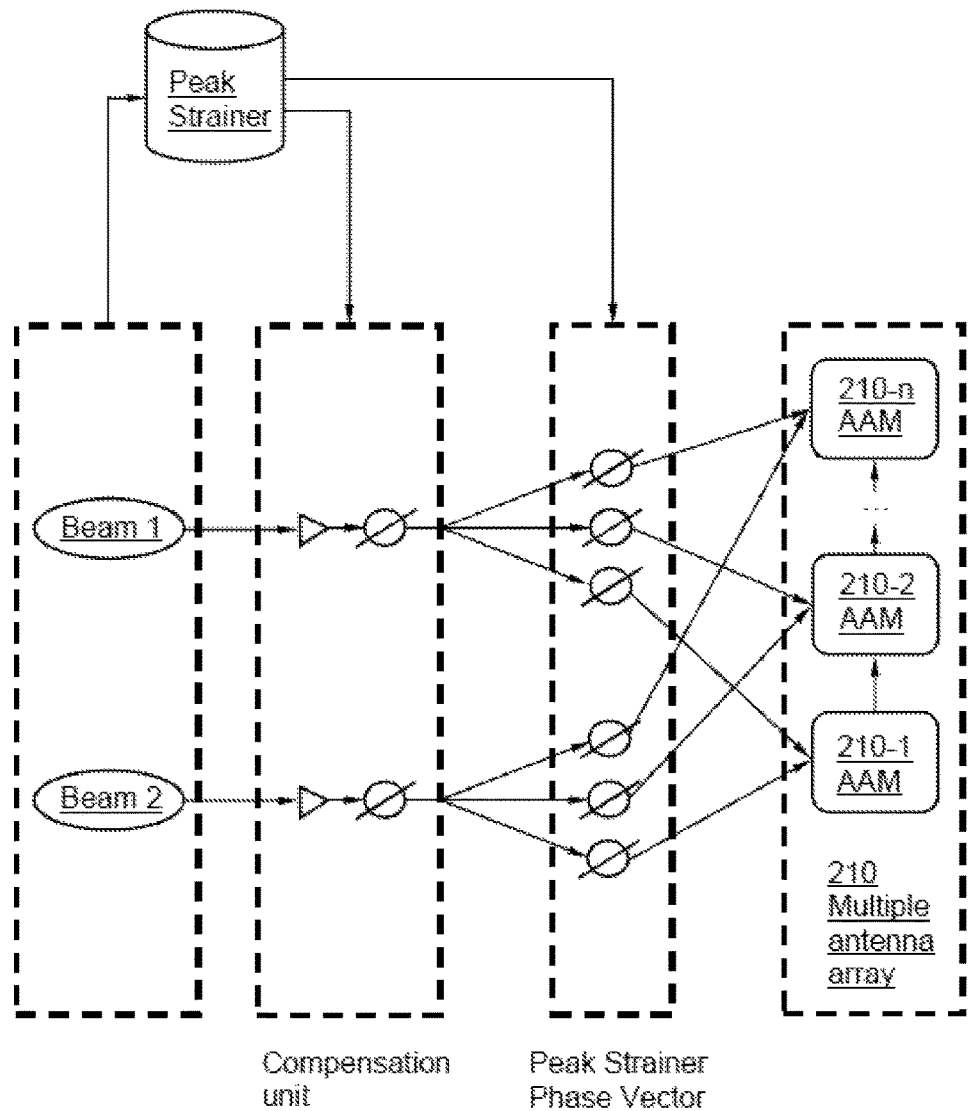
FIG. 3A is a block diagram illustrating a radio network node architecture according to an embodiment of the disclosure.
Figure 3B:
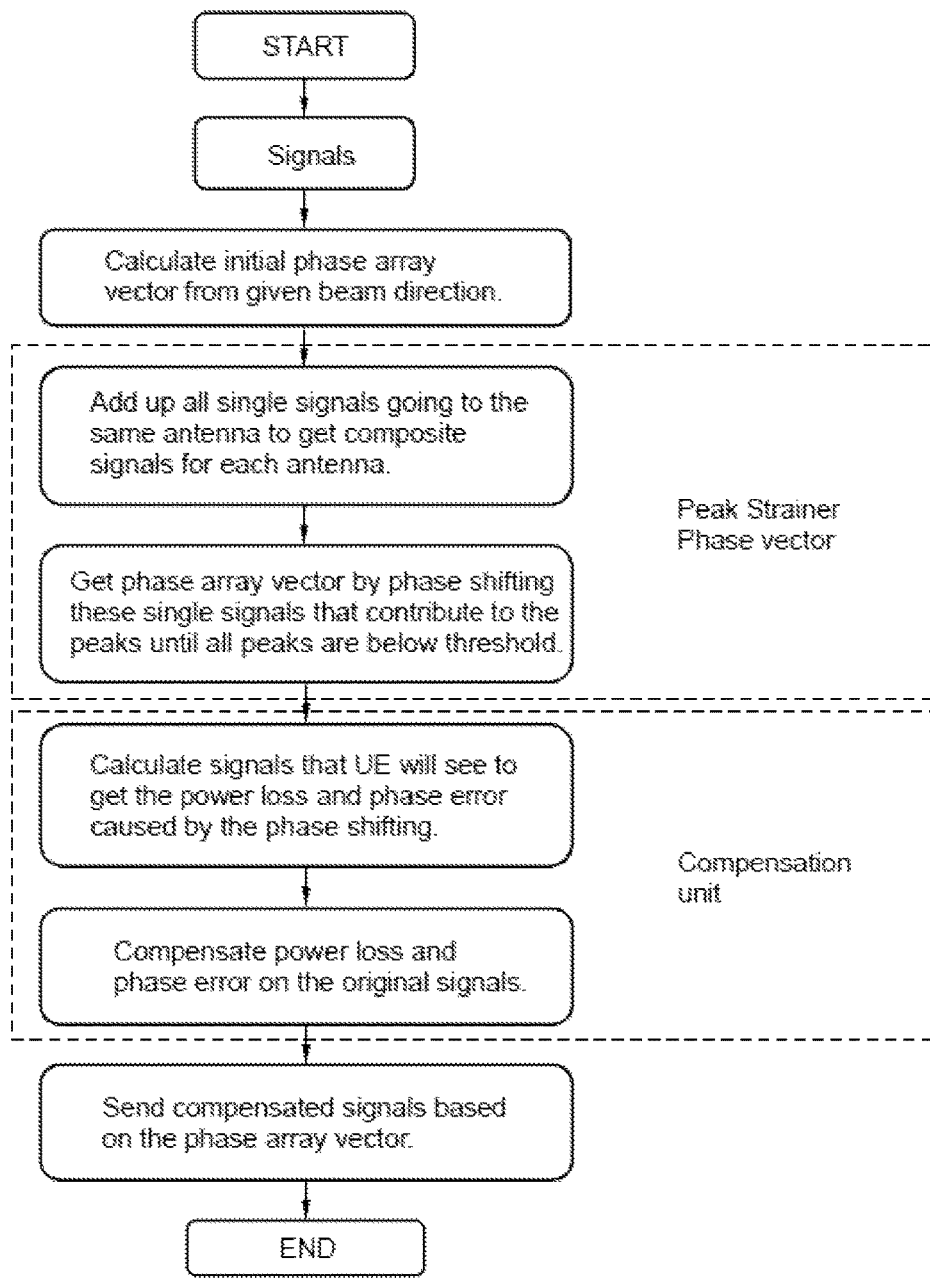
FIG. 3B is a block diagram illustrating a radio network node architecture according to an embodiment of the disclosure.

FIGS. 3A and 3B disclose embodiments of the radio network node 110 in the wireless communication network 100, which embodiments are illustrated from a structural and a functional perspective, respectively.

A classical MIMO System which steers multiple beams will have a set number of antennas 210-1, 210-2, ..., 210-n, e.g. as illustrated in FIG. 2. To steer a beam, the original signal is duplicated and put into each antenna 210-1, 210-2, ..., 210-n with an appropriate phase shift to steer the beam in a certain desired direction, i.e. to reach the intended user equipment 120.

According to an embodiment, the PAPR of a sum of multiple input signals may be lowered. Thereby, the amplitude of a signal to each antenna element 210-1, 210-2, ..., 210-n by changing the phase of the input signals to each antenna element 210-1, 210-2, ..., 210-n, known as Peak Strainer Phase Array Vector in FIGS. 3A and 3B.

This however will create a power loss and a phase error for the received signal, which power loss and a phase error may be compensated for, in order to correct this error, as illustrated in FIG. 3B, e.g. in a compensation unit according to some embodiments. Such compensation may comprise e.g. calculation of signals that the user equipment 120 will see to get the power loss and phase error caused by the phase shifting, and also addition of compensation for the calculated power loss and phase error on the original signals, according to some embodiments.

Lowering of PAPR makes it possible to use amplifiers more efficiently which translates into more power using the original amplifier, or changing to a smaller more efficient amplifier in order to save power.

In some embodiments, PAPR may be reduced only for OFDM symbols, referred to as Partial Transmit Sequence (PTS). Similarly to how the Peak Strainer may perform a phase shift for to each transmitted symbols to avoid peaks, PTS does a phase shift to a cluster of symbols to avoid peaks.

Thereby, compensation of phase error and power loss may be made after lowering the PAPR of signals using phase shifts to each antenna element 210-1, 210-2, . . . , 210-n for the multi antenna system in the radio network node 110.

FIG. 3C illustrates the peak of a composite signal before phase shift, while FIG. 3D illustrates the peak of the composite signal after the phase shift according to an embodiment. In a multi user system there may be more than one signal going to each antenna element 210-1, 210-2, . . . , 210-n. High peaks thus may appear when some, or all of those signals are constructively added up. According to some embodiments of the method, the incoming signals are instead phase shifted in order to avoid a constructive add up which exceeds a threshold value. In the illustrated example, the individual signals that are forming the composite signal are phase shifted in the opposite direction of the peak, which results in a lower amplitude of the composite signal.

FIG. 4A describes principles according to an illustrative embodiment of the disclosure. The radio network node 110 in the wireless communication network 100 is configured for transmitting multiple parallel signals to be received by the intended user equipment 120, thanks to the above described massive MIMO environment. By performing manipulation of the spatial profile of the transmitted signal, i.e. the directions that the signal is transmitted in, angles of departure φ1, φ2, . . . , φn at each respective antenna element 210-1, 210-2, . . . , 210-n comprised in the multiple antenna array 210, PAPR may be reduced at each individual branch. At the same time, it may be avoided to deteriorate the signal to be transmitted. Such deterioration of the signal may be referred to as Error Vector Magnitude (EVM), which is a measure on the magnitude of the signal deterioration, in the directions for which the signal is (desired to be) transmitted, i.e. the angles of departure φ1, φ2, . . . , φn at each respective antenna element 210-1, 210-2, . . . , 210-n. The signal may be deteriorated in other directions, which however does not matter, as the transmission power in those directions anyway is low and the intended user equipment 120 is not listening there anyway. An advantage according to some embodiments is that it is not required to provide any side information to the receiving part, the user equipment 120, as the transmitted information is not distorted in the directions the user equipment 120 is receiving the signals on. Thus the user equipment 120 does not have to make any particular signal processing in order to be able to decode the signal. Further, no particular change in access standard specification has to be made, which makes implementation easy. Further, it has been noted that the efficiency of the method according some of these embodiments increase with the number of beams. To maintain cell coverage and avoid interference of neighbouring cells, a maximum beam power may be allowed. As the number of beams increase, the total output power thus increase, both average and peak per antenna branch. Thus more PAPR reduction is required to avoid saturation of the power amplifier subsystem. An advantage of these embodiments is that the method becomes more efficient when actually required.

Figure 4B:
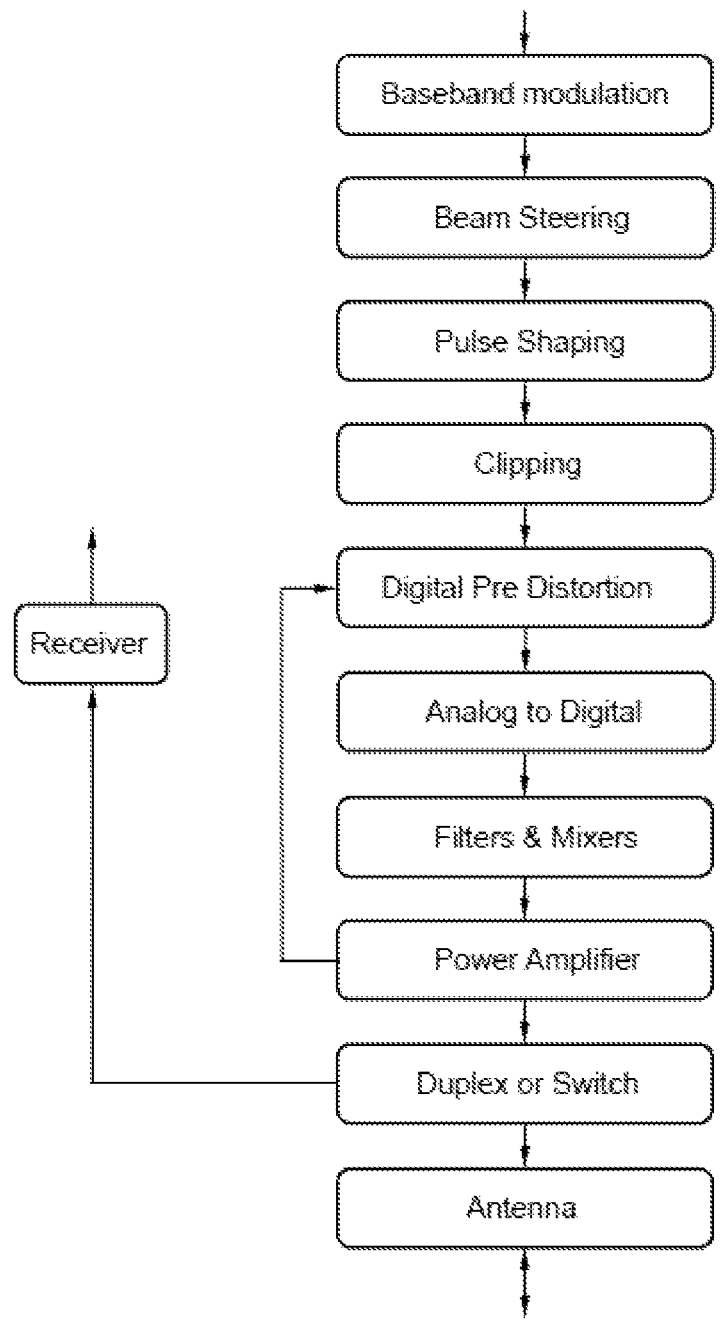
FIG. 4B is a block diagram illustrating a radio network node architecture according to an embodiment of the disclosure.

FIG. 4B describes an embodiment of the method in the radio network node 110. Data bits that are to be transmitted to the user equipment 120 may be baseband modulated. Further, a digital pre distortion may by applied, which pre distortion compensates for the distortion made by the power amplifier. Thus power amplifier characteristics may be measured and pre compensated according to some embodiments. Further, signal peaks may be reduced by clipping.

Figure 5:
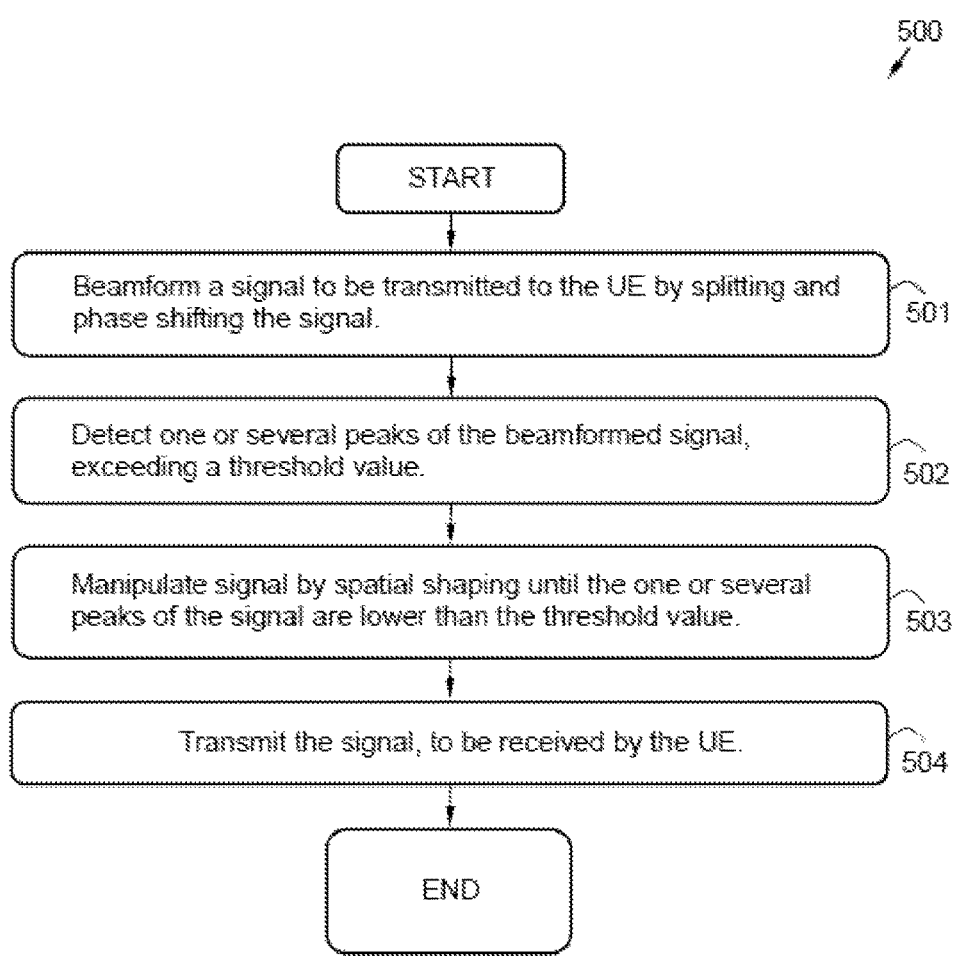
FIG. 5 is a flow chart illustrating a method in a radio network node according to an embodiment of the disclosure.

FIG. 5 is a flow chart illustrating embodiments of a method 500 in a radio network node 110, for wireless communication with a UE 120 in a wireless communication system 100 in antenna streams. The radio network node 110 comprises, or is connectable to; a plurality of antenna elements 210-1, 210-2, . . . , 210-n, forming a multiple antenna array 210 which is configured for massive Multiple Input Multiple Output (MIMO) transmission.

The multiple antenna array 210 comprises a multitude of n antenna elements 210-1, 210-2, . . . , 210-n, such as e.g. hundred or more antenna elements 210-1, 210-2, . . . , 210-n in some embodiments. The wireless communication system 100 thus may be configured for massive MIMO, according to some embodiments. The multitude of antenna elements may in some embodiments be mounted at a distance from each other, within the multiple antenna array 210, such that some, several or even all of the antenna elements may be able to receive/transmit the same signal from/to the user equipment 120.

The wireless communication network 100 may be based on 3GPP LTE. Further, the wireless communication system 100 may be based on FDD or TDD in different embodiments. The radio network node 110 may comprise an eNodeB according to some embodiments. The signal to be transmitted may comprise Orthogonal Frequency Division Multiplexing (OFDM) symbols according to some embodiments.

To appropriately communicate in antenna streams with the user equipment 120, the method 500 may comprise a number of actions 501-504.

It is however to be noted that any, some or all of the described actions 501-504, may be performed in a somewhat different chronological order than the enumeration indicates, be performed simultaneously or even be performed in a completely reversed order according to different embodiments. Further, it is to be noted that some actions may be performed in a plurality of alternative manners according to different embodiments, and that some such alternative manners may be performed only within some, but not necessarily all embodiments. The method 500 may comprise the following actions:

Action 501

A signal to be transmitted to the user equipment 120 is beamformed by splitting and phase shifting the signal.

Action 502

A peak of power of one beamformed 501 signal, which is exceeding a threshold value is detected. Such detection may be made by a comparison with the threshold value, which may be predetermined and/or configurable.

Action 503

The signal is manipulated until the peak of power of the signal is lower than the threshold value.

Such manipulation of the signal may be made in different manners according to different embodiments.

Thus according to some embodiments, the manipulation of the signal may comprise further phase shifting said signal until the peak of power of the signal is lower than said threshold value. Then, the manipulation may comprise estimating power loss and phase error on the further phase shifted signal, as perceived by the user equipment 120. Further, the manipulation of the signal may comprise compensating the signal for the further phase shift, based on the estimated power loss and phase error. Such further phase shift of the signal may comprise a phase shift in the opposite direction of the peak, such that the amplitude of the signal may be reduced.

However, in some embodiments, the manipulation of the signal comprises spatial and temporal shaping of a correction signal z, which correction signal z is applied to the signal to be transmitted to the user equipment 120, until the peak of power of the signal is lower than said threshold value.

Such spatial and temporal shaping of the correction signal z may comprise determining angle of departure $\phi 1$, $\phi 2, \ldots, \phi n$ of each beam to be transmitted by the multiple antenna array 210. Further, the spatial and temporal shaping of the signal may comprise removing energy of the correction signal z in directions according to the determined respective angle of departure $\phi 1, \phi 2, \ldots, \phi n$ of each beam to be transmitted by the multiple antenna array 210.

According to some embodiments, the spatial and temporal shaping of the correction signal z may comprise transformation of the correction signal z into antenna domain and application of a filter for filtering the correction signal z according to some embodiments.

Thereby, by performing manipulation of the spatial profile of the transmitted signal, i.e. the directions that the signal is transmitted in, i.e. the respective angle of departure $\phi 1, \phi 2, \ldots \phi n$ at each respective antenna element 210-1, 210-2, ..., 210-n comprised in the multiple antenna array 210, PAPR may be reduced at each individual branch. Thereby, signal deterioration in the directions for which the signal is (desired to be) transmitted, may be avoided according to some embodiments.

However, according to some embodiments, the spatial and temporal shaping of the signal may comprise transformation of the signal into antenna domain and application of a filter for filtering the signal.

Action 504

The signal is transmitted, to be received by the user equipment 120.

Figure 6A:
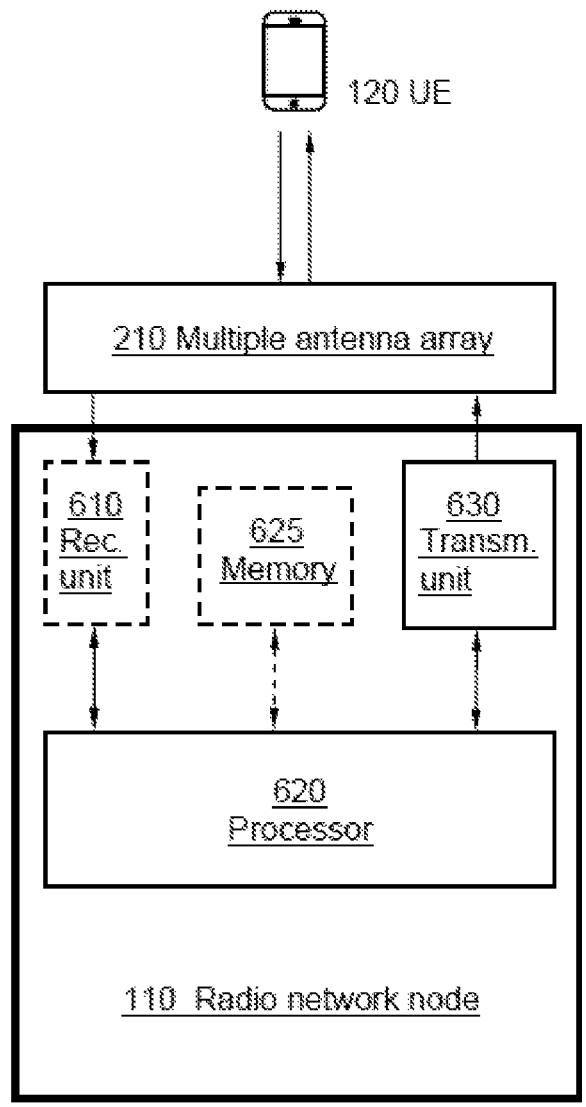
FIG. 6A is a block diagram illustrating a radio network node architecture according to an embodiment of the disclosure.

FIG. 6A illustrates an embodiment of a radio network node 110, configured for wireless communication with a user equipment 120 in a wireless communication system 100 in antenna streams. The radio network node 110 comprises a plurality of antenna elements 210-1, 210-2, ..., 210-n, forming a multiple antenna array 210 which is configured for massive Multiple Input Multiple Output (MIMO) transmission. The radio network node 110 is configured for performing the method 500, according to any, some, all, or at least one of the enumerated actions 501-504, according to some embodiments. The signal to be transmitted may comprise Orthogonal Frequency Division Multiplexing (OFDM) symbols.

The radio network node 110 may according to some embodiments comprise an evolved NodeB, eNodeB. The wireless communication network 100 may optionally be based on 3rd Generation Partnership Project Long Term Evolution, 3GPP LTE.

The radio network node 110 comprises a processor 620, configured for beamforming a signal to be transmitted to the user equipment 120 by splitting and phase shifting the signal. Further, the processor 620 is also configured for detecting a peak of power of one beamformed signal, exceeding a threshold value, and configured for manipulating the signal until the peak of power of the signal is lower than the threshold value.

The processor 620 may also be configured for further phase shifting the signal until the peak of power of the signal is lower than the threshold value, according to some embodiments. In addition, the processor 620 may be configured for estimating power loss and phase error on the further phase shifted signal, as perceived by the user equipment 120. Furthermore, the processor 620 according to some embodiments may be further configured for compensating the signal for the further phase shift, based on the estimated power loss and phase error.

The processor 620 may in addition be configured for further phase shifting the signal in the opposite direction of the peak, according to some embodiments.

The processor 620 may furthermore be configured for manipulating the signal by spatial and/or temporal shaping of the signal to be transmitted to the user equipment 120, until the peak of power of the signal is lower than the threshold value, according to some embodiments.

According to some embodiments, the processor 620 may further be configured for manipulating the signal by spatial and temporal shaping of a correction signal z, which correction signal z is applied to the signal to be transmitted to the user equipment 120, until the peak of power of the signal is lower than said threshold value.

The processor 620 may further be configured for determining angle of departure $\phi 1, \phi 2, \ldots, \phi n$ of each beam to be transmitted by the multiple antenna array 210 and also configured for removing energy of the correction signal z in directions according to the determined respective angle of departure of each beam, to be transmitted by the multiple antenna array 210. In some embodiments, energy may be removed by applying a discrete Fourier transform on the signal, according to some embodiments.

In some embodiments, the processor 620 may also be further configured for transformation of the correction signal z into antenna domain and application of a filter for filtering the correction signal z.

Such processor 620 may comprise one or more instances of a processing circuit, i.e. a Central Processing Unit (CPU), a processing unit, a processing circuit, a processor, an Application Specific Integrated Circuit (ASIC), a microprocessor, or other processing logic that may interpret and execute instructions. The herein utilised expression "processor" may thus represent a processing circuitry comprising a plurality of processing circuits, such as, e.g., any, some or all of the ones enumerated above.

The radio network node 110 also comprises a transmitter 630, configured for transmitting the wireless signal, to be received by the user equipment 120.

In addition, according to some embodiments, the radio network node 110 may comprise a receiving unit 610, configured for receiving radio signals over a wireless interface. The radio signals may be received from, e.g., the user equipment 110, or any other entity configured for wireless communication according to some embodiments.

Furthermore, the radio network node 110 may comprise at least one memory 625, according to some embodiments. The optional memory 625 may comprise a physical device utilised to store data or programs, i.e., sequences of instructions, on a temporary or permanent basis. According to some embodiments, the memory 625 may comprise integrated circuits comprising silicon-based transistors. Further, the memory 625 may be volatile or non-volatile.

Figure 6B:
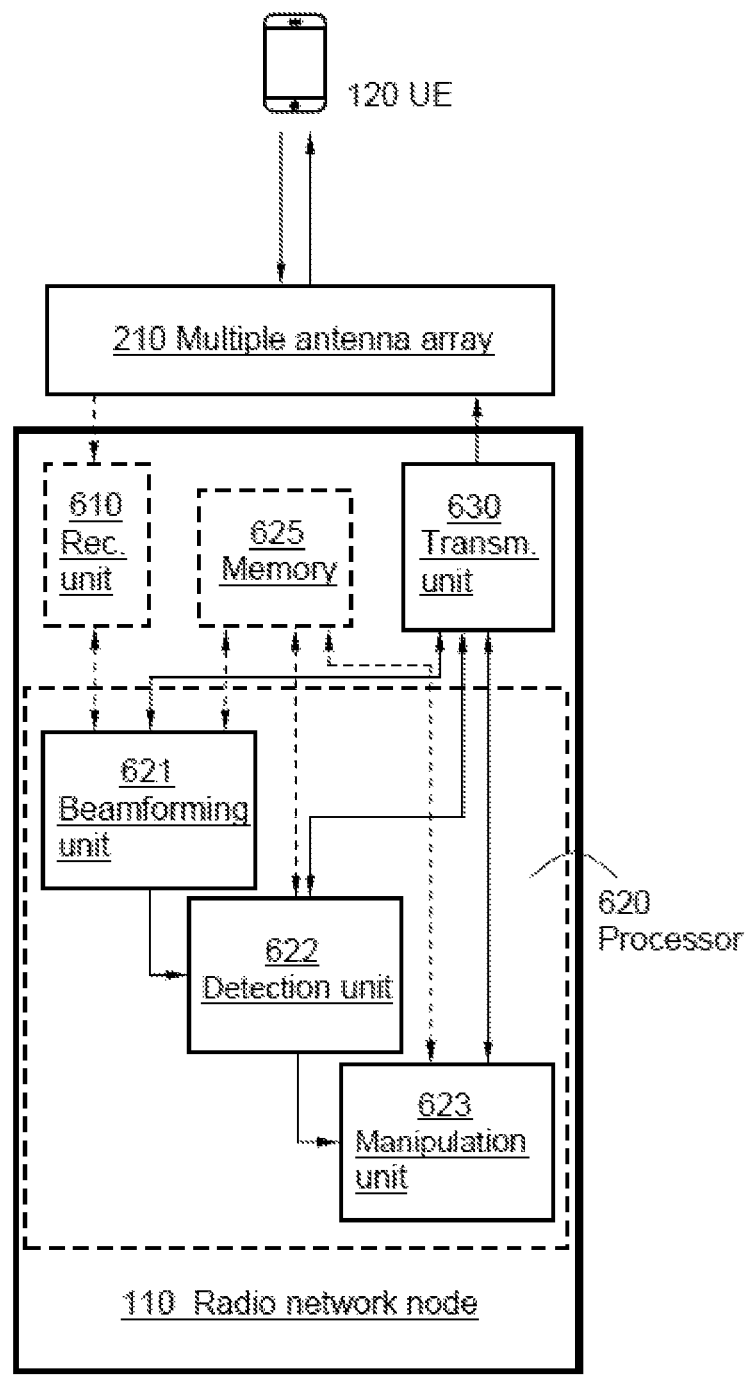
FIG. 6B is a block diagram illustrating a radio network node architecture according to an embodiment of the disclosure.

FIG. 6B illustrates an embodiment of a radio network node 110, configured for wireless communication with a user equipment 120 in a wireless communication system 100 in antenna streams, similar to the embodiment illustrated in FIG. 6A.

In the illustrated alternative embodiment, the processor 620, and/or the radio network node 110 may comprise a beamforming unit 621, a detection unit 622, and a manipulation unit 623.

According to some such embodiments, the beamforming unit 621 may be configured for beamforming a signal to be transmitted to the user equipment 120 by splitting and phase shifting said signal.

Further, according to some such embodiments, the detection unit 622 may be configured for detecting a peak of power of one beamformed signal, exceeding a threshold value.

In addition, the manipulation unit 623 may be configured for manipulating the signal until the peak of power of the signal is lower than the threshold value, according to some embodiments.

Optionally, the manipulation unit 623 may be configured for further phase shifting the signal until the peak of power of the signal is lower than the threshold value, according to some embodiments. In addition, the manipulation unit 623 may be configured for estimating power loss and phase error on the further phase shifted signal, as perceived by the user equipment 120. Furthermore, the manipulation unit 623 according to some embodiments may be further configured for compensating the signal for the further phase shift, based on the estimated power loss and phase error.

The manipulation unit 623 may in addition be configured for further phase shifting the signal in the opposite direction of the peak, according to some embodiments.

The manipulation unit 623 may furthermore be configured for manipulating the signal by spatial and temporal shaping of a correction signal z, which correction signal z is applied to the signal to be transmitted to the user equipment 120, until the peak of power of the signal is lower than said threshold value.

The manipulation unit 623 may further be configured for determining angle of departure $\phi 1, \phi 2, \ldots, \phi n$ of each beam to be transmitted by the multiple antenna array 210 and also configured for removing energy of the correction signal z in directions according to the determined respective angle of departure of each beam, to be transmitted by the multiple antenna array 210. In some embodiments, energy may be removed by applying a discrete Fourier transform on the signal, according to some embodiments.

In some embodiments, the manipulation unit 623 may also be further configured for transformation of the correction signal z into antenna domain and application of a filter for filtering the correction signal z.

The actions 501-504 to be performed in the radio network node 110 may be implemented through the one or more processing circuits 620 in the radio network node 110, together with computer program product for performing the functions of the actions 501-504. Thus a computer program product, comprising instructions for performing the actions 501-504 in the radio network node 110 may perform wireless communication with a user equipment 120 in a wireless communication system 100 in antenna streams, when the computer program product is loaded in a processing circuit 620 of the radio network node 110.

Thus a computer program comprising program code for performing the method 500 according to any of the actions 501-504, may perform wireless communication with a user equipment 120 in a wireless communication system 100 in antenna streams, when the computer program is loaded into a processor 620 of the radio network node 110.

Thereby a computer program product may comprise a computer readable storage medium storing program code thereon for use by a radio network node 110, for wireless communication with a user equipment 120 in a wireless communication system 100 in antenna streams. The program code comprising instructions for executing a method 500 comprising: beamforming 501 a signal to be transmitted to the user equipment 120 by splitting and phase shifting the signal, detecting 502 a peak of power of one beamformed 501 signal, exceeding a threshold value, manipulating 503 the signal until the peak of power of the signal is lower than the threshold value and transmitting 504 the signal, to be received by the user equipment 120.

The computer program product mentioned above may be provided for instance in the form of a data carrier carrying computer program code for performing at least some of the actions 501-504 according to some embodiments when being loaded into the processor 620. The data carrier may be, e.g., a hard disk, a CD ROM disc, a memory stick, an optical storage device, a magnetic storage device or any other appropriate medium such as a disk or tape that may hold machine readable data in a non transitory manner. The computer program product may furthermore be provided as computer program code on a server and downloaded to the radio network node 110 remotely, e.g., over an Internet or an intranet connection.

The terminology used in the description of the embodiments as illustrated in the accompanying drawings is not intended to be limiting of the described method 500 and/or radio network node 110. Various changes, substitutions and/or alterations may be made, without departing from the disclosure as defined by the appended claims.

As used herein, the term "and/or" comprises any and all combinations of one or more of the associated listed items. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g. a processor may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms such as via Internet or other wired or wireless communication system.

What is claimed is:

1. A method, in a radio network node, for wireless communication with a user equipment, wherein the radio network node comprises a plurality of antenna elements, forming a multiple antenna array which is configured for massive Multiple Input Multiple Output (MIMO) transmission, the method comprising:

splitting and phase shifting a signal to be transmitted to the user equipment to obtain multiple beamformed signals, wherein the multiple beamformed signals are transmitted by the multiple antenna array;

detecting a peak power of a signal received by the multiple antenna array that exceeds a threshold value;

manipulating the signal received by the multiple antenna array until the peak power of the signal received by the multiple antenna array is lower than the threshold value, wherein the manipulation includes spatial and temporal shaping of a correction signal (z) applied to the signal to be transmitted until the peak power is lower than the threshold value and the spatial and temporal shaping of the correction signal (z) comprises determining an angle of departure (φ1, φ2, . . . , φn) of each of the beamformed signals;

removing energy of the correction signal (z) in directions according to the determined angle of departure of each of the beamformed signals; and transmitting the manipulated signal to the user equipment by way of the multiple beamformed signals transmitted by the multiple antenna array.

2. The method according to claim 1, where the spatial and temporal shaping of the correction signal (z) comprises:

transformation of the correction signal (z) into antenna domain and application of a filter for filtering the correction signal (z).

3. The method according to claim 1, wherein the signal to be transmitted comprises Orthogonal Frequency Division Multiplexing (OFDM) symbols.

4. A radio network node configured for wireless communication with a user equipment, the radio network node comprising:

a plurality of antenna elements forming a multiple antenna array configured for massive Multiple Input Multiple Output (MIMO) transmission;

a processor configured to:

split and phase shift a signal to be transmitted to the user equipment to obtain multiple beamformed signals, wherein the multiple beamformed signals are transmitted by the multiple antenna array, detect a peak power of a signal received by the multiple antenna array that exceeds a threshold value, manipulate the signal received by the multiple antenna array until the peak power of the signal received by the multiple antenna array is lower than the threshold value, wherein the manipulating includes spatial and temporal shaping of a correction signal (z) applied to the signal to be transmitted, determine an angle of departure (φ1, φ2, . . . , φn) of each of the beamformed signals, and remove energy of the correction signal (z) in directions according to the determined angle of departure of each of the beamformed signals; and a transmitter configured to transmit the manipulated signal to the user equipment by way of the multiple beamformed signals transmitted by the multiple antenna array.

5. The radio network node according to claim 4, wherein the processor is further configured to:

further phase shift one of the multiple beamformed signals until the peak power of the signal received by the multiple antenna array is lower than said threshold value;

estimate power loss and phase error on the further phase shifted signal, as perceived by the user equipment; and compensate the further phase shifted signal based on the estimated power loss and phase error.

6. The radio network node according to claim 5, wherein the processor is further configured to manipulate the signal by spatial and temporal shaping of a correction signal (z), where correction signal (z) is applied to the signal to be transmitted to the user equipment, until the peak of power of the signal received by the multiple antenna array is lower than said threshold value.

7. The radio network node according to claim 6, wherein the processor is further configured to transform the correction signal (z) into antenna domain and to apply a filter for filtering the correction signal (z).

8. The radio network node according claim 4, wherein the radio network node comprises an evolved NodeB (eNodeB); and wherein the wireless communication network is based on 3rd Generation Partnership Project Long Term Evolution (3GPP LTE).

9. A computer program product comprising a non-transitory computer readable storage medium storing program code thereon for use by a radio network node, for wireless communication with a user equipment, wherein the program code comprises instructions for executing a method comprising:

splitting and phase shifting a signal to be transmitted to the user equipment to obtain multiple beamformed signals;

detecting a peak power of one beamformed signal in the multiple beamformed signals that exceeds a threshold value;

manipulating the one beamformed signal until the peak power of the one beamformed signal is lower than said the threshold value, wherein the manipulation includes shaping of a correction signal (z), where the shaping comprises determining an angle of departure of at least the one beamformed signal;

removing energy of the correction signal (z) in a direction according to the determined angle of departure of at least the one beamformed signal; and transmitting said the manipulated beamformed signal to the user equipment.

10. The computer program product according to claim 9, wherein the program code further comprises instructions for executing the method comprising:

the spatial and temporal shaping of the correction signal (z) comprises transformation of the correction signal (z) into an antenna domain and application of a filter for filtering the correction signal (z).

* * * * *